United States Patent [19]

Sauber

[11] 4,239,629
[45] Dec. 16, 1980

[54] CARBOXYMETHYLHYDROXYETHYL CELLULOSE IN DRILLING, WORKOVER AND COMPLETION FLUIDS

[75] Inventor: Charles A. Sauber, Bartlesville, Okla.

[73] Assignee: Phillips Petroleum Company, Bartlesville, Okla.

[21] Appl. No.: 912,689

[22] Filed: Jun. 5, 1978

[51] Int. Cl.³ .............................................. C09K 7/02
[52] U.S. Cl. .......................... 252/8.5 C; 252/8.5 A; 252/8.55 R; 252/316
[58] Field of Search ............. 252/8.5 A, 8.5 C, 8.55 R, 252/8.55 C, 8.55 D, 316

[56] References Cited

U.S. PATENT DOCUMENTS

| 3,251,781 | 5/1966 | Jordan | 252/316 |
| 3,727,687 | 4/1973 | Clampitt et al. | 166/274 |
| 3,818,998 | 6/1974 | Hessert | 175/72 |
| 3,833,061 | 9/1974 | Gall | 166/294 |
| 3,921,733 | 11/1975 | Clampitt | 252/8.5 X |
| 4,068,720 | 1/1978 | Hessert et al. | 252/8.55 X |
| 4,110,231 | 8/1978 | Swanson | 252/8.5 |

FOREIGN PATENT DOCUMENTS 978938 12/1975 Canada ..................................... 252/316

*Primary Examiner*—Herbert B. Guynn

[57] ABSTRACT

Certain carboxymethylhydroxyethyl cellulose (CMHEC) solutions in waters of various salinities are gelled by dichromate ion at a pH of about 5 or less, thus forming a drilling fluid or component thereof. In an embodiment a CMHEC water solution is gelled using an alkali metal dichromate, e.g., $Na_2Cr_2O_7 \cdot 2H_2O$.

8 Claims, No Drawings

CARBOXYMETHYLHYDROXYETHYL CELLULOSE IN DRILLING, WORKOVER AND COMPLETION FLUIDS

The present invention relates to water-base well drilling, workover, or completion fluids of various salinities and having as low as zero insoluble solids content. More particularly, it relates to such a drilling fluid which has gel strength. More specifically, it relates to such a drilling fluid comprising (1) a water-soluble carboxymethylhydroxyethyl mixed cellulose ether (CMHEC) having a certain carboxymethyl degree of substitution and a certain hydroxyethyl molar substitution and (2) sodium dichromate dihydrate as a gelling agent.

In the art of drilling wells, especially drilling by the rotary method, it is necessary to use a drilling mud, a drilling fluid containing insoluble solids, as is well understood in the art. The drilling fluid lubricates the drill stem, carries drill cuttings to the surface at the well, and forms a filter cake on the walls of the borehole preventing undesirable loss of any substantial amount of water from the drilling fluid to the natural formations surrounding the well. To perform these important functions properly, the drilling fluid must have suitable viscosity and other qualities. These qualities must remain stable at all times in spite of adverse conditions encountered in drilling the well. For instance, viscosity of the fluid must be sufficiently high to clean the hole, yet low enough to be readily pumpable.

For many reasons it may be desirable to have a drilling fluid with a high salt content. For instance, salt curbs bacterial action. In drilling through formations of high salt content such a fluid is necessary to prevent the formation from being dissolved to avoid cave-in of the borehole. Salt prevents the drilled clayey solids from swelling rapidly which would otherwise substantially thicken the drilling fluid. Salt increases and maintains the density of the drilling mud within a desired range without increasing the suspended solids content, and thus provides weight without sacrifice of low insoluble solids content. Salt usually reduces damage to production sands containing swellable clay.

Low insoluble solids content in the drilling fluid is desirable to enable the drill bit to cut faster, to minimize maintenance problems caused by large amounts of abrasive solids, and to minimize damage to producing formations by plugging. Increased weight without insoluble solids is particularly desirable to control formation pressures in workover and completion work. No suitable fluid has been produced for these types of drilling and workover operations. The major difficulty has been the inability to develop precise gel strength control in low-solids fluids and particularly in no-solids polymer fluids. Previous no-solids polymer fluids have had no gel strength.

Salt is encountered in the earth when drilling in certain locations. This salt will render the drilling mud or fluid high in salt content even when the drilling fluid initially contains no salt. Furthermore, the use of sea water is quite common and advantageous for offshore drilling operations.

I have found that high viscosity CHMEC effectively viscosifies fresh water and various types of brine. Further, I have found that CMHEC solutions readily gel when employing a suitable gelling agent, e.g., sodium dichromate dihydrate (DiCr). Further, I have found that aging increases the gel strength of this fluid. I have also found that CMHEC solutions containing DiCr may be gelled in situ. Further, importantly, I have found that CMHEC, as herein further defined, can be gelled in water using DiCr in the presence of sodium chloride, potassium chloride and the like without there being present a reducing agent, as described in U.S. Pat. No. 3,727,687, Richard L. Clampitt and James E. Hessert issued Apr. 7, 1973, the disclosure of which is incorporated herein by reference. Still further, it has been found that aging of the solution containing the CMHEC and DiCr, e.g., from one to ten days increases the gelling characteristics of the dispersion. Further still, such a dispersion can be used as a mobility buffer in water floods or for water diversion purposes. And still further, such a dispersion can be used to carry sand in sand packing and hydraulic fracturing operations.

Further, such a dispersion could be used for diversion in a water flood. Alternate injection of dichromate and CMHEC polymer solution should work well for this purpose.

In the foregoing identified patent, there is disclosed the use of combinations of cellulose ethers, compounds of reducible polyvalent metals and reducing agents. The patent does not disclose that the reducing agent can be omitted and that a gel can nevertheless be obtained. The patent does not, therefore, disclose that a gel particularly suited for completion or workover fluid can be formed if the reducing agent is omitted.

Following the disclosure of the Clampitt patent, the gel which is obtained will not be as suitable for completion and workover purposes. It may be too stiff for use as a workover fluid or completion fluid or component thereof.

Thus, when all three species or ingredients above defined are present, gelation will occur regardless of the species of cellulose ether. The gel may be very firm or stiff.

Particularly noteworthy is that we have found that whereas the mixed cellulose ether CMHEC will give gelation without use of a reducing agent, neither carboxymethyl cellulose (CMC) nor hydroxyethyl cellulose (HEC) will give such a gel. See Table III.

Accordingly, in one of its concepts, the invention provides a method for producing a desirable gel, especially suited for completion or workover operations, by bringing together CMHEC, as later further defined, and dichromate ion. The invention is based upon the discovery that CMHEC, as further defined herein, alone of the herein named cellulose ethers, can be gelled by the sole addition of DiCr.

It is an object of this invention to produce a drilling fluid which has gel strength. A further object of the invention is to produce a drilling fluid containing a cellulose ether which has been gelled by employing a dichromate compound. It is a further object of the invention to produce a fluid as herein described suitable for completion or workover of a well or as a component of such a fluid. It is a further object of the invention to provide a gel having certain characteristics not heretofore obtained as when a reducing agent has been used.

Other aspects, concepts, objects and the several advantages of the invention are apparent from a study of this disclosure and the appended claims.

According to the present invention there is provided gelled CMHEC, as further defined herein.

Also according to the invention there is provided a method for producing such a gelled CMHEC which comprises bringing together the CMHEC and a dichromate compound in the presence of fresh water or water containing salt, e.g., sodium chloride, calcium chloride, magnesium chloride or potassium chloride as may exist in a brine.

The terms "D.S." and "M.S." are, respectively, abbreviations for "degree of substitution" and "molar substitution."

There are three hydroxyl groups in each anhydroglucose unit in the cellulose molecule. D.S. is the average number of hydroxyl groups substituted in the cellulose per anhydroglucose unit. Thus, the D.S. of a cellulose derivative can be no higher than 3. M.S. is the average number of moles of reactant combined with the cellulose per anhydroglucose unit. For the alkyl, carboxyalkyl, or acyl derivatives of cellulose, the D.S. and the M.S. are the same. For the hydroxyalkyl derivatives of cellulose, the M.S. is generally greater than the D.S. The reason for this is that each time a hydroxyalkyl group is reacted with the cellulose molecule, an additional hydroxyl group is formed which itself is capable of hydroxyalkylation. As a result of this, side chains of considerable length may form on the cellulose molecule. The M.S./D.S. ratio represents the average length of these side chains.

For the mixed ethers involved herein, i.e., CMHEC, the first value given is the carboxymethyl D.S. times 10 and the second value given is the hydroxyethyl M.S. times 10. Three types of CMHEC which represent the present range of commercially available material are CMHEC of 0.3 carboxymethyl D.S. and 0.7 hydroxyethyl M.S. (Type 37L), CMHEC of 0.4 carboxymethyl D.S. and 2.0 hydroxyethyl M.S. (Type 420H) and CMHEC of 0.9 carboxymethyl D.S. and 0.2 hydroxyethyl M.S. (Type 902MH). The "L", "MH" and "H" refer to relative viscosity grade, low, medium high, and high, respectively.

Prior art carboxymethylcellulose (CMC), hydroxyethylcellulose (HEC), and CMHEC have been used as drilling fluid additives, but they are generally not really suitable for the purposes to which drilling fluids of the invention are applied.

According to the present invention, an increase in gel strength of CMHEC solutions is realized by adding only a minor amount of dichromate compound such as sodium dichromate dihydrate, $Na_2Cr_2O_7.2H_2O$, at about 0.5 pounds per barrel to about 2 pounds per barrel of solution.

Type 420H CMHEC is now a preferred material and is used at about 2 pounds per barrel in solution. The gel is formed with sodium dichromate dihydrate without use of a reducing agent. A pH of the fluid of about 5 or lower is necessary because if the pH is above 5, gelation occurs more slowly, if at all. Dichromate ion is needed and does not exist except at an acid pH.

A reducing agent such as sodium hydrosulfite as taught in Clampitt and Hessert U.S. Pat. No. 3,727,687 may be added to cause more rapid gelation or gelation when none occurs above pH of 5.

This invention finds that gelation can be accomplished without the use of a reducing agent. As noted earlier, this is not the case with either CMC or HEC.

The carboxymethyl D.S. of the CMHEC can be from about 0.1 to at least about 0.9 and the hydroxyethyl M.S. can be from about 0.2 to at least about 2.7. High viscosity grade CMHEC is preferable because gelling occurs more rapidly when the solution viscosity is high. If solution viscosity is too low the gel appears as discrete gel particles throughout the fluid and gel strength does not develop readily.

The data herein were obtained using sodium, potassium, and ammonium dichromates. Range of dichromate added is from about 0.25 to about 5 pounds per barrel. A more practical range is from about 0.5 to about 2 pounds per barrel.

Experimental Data

In the tables and elsewhere herein, unless otherwise indicated, parts, percent and ratios are by weight. Tests were made according to API RP 13B "Standard Procedure for Testing Drilling Fluids."

Tests were made which demonstrate in Table I:

1. Gelling of CMHEC solutions is accomplished by dichromate ion alone

When potassium permanganate, cited in U.S. Pat. No. 3,727,687 Clampitt & Hessert, alone is used, the solution is not gelled, the CMHEC polymer is degraded (Part A a, No. 10). When gelling by dichromate ion occurs, the pH of the fluid is 5 or less and the solution has an orange color. Thus, a sufficient amount of dichromate ion is needed to reduce the polymer solution pH to around 5 or less before gelling occurs. However, the more dichromate added, above the minimum required, the quicker gelling occurs (Part A a, Nos. 2–6). The type of dichromate compound is not critical (Part A a, No. 7,8). Further, chromate ion will not cause gelation (Part A a, A b, No. 9). If the pH of a CMHEC solution containing sufficient chromate ion is reduced with acid to a value somewhere less than 5, gelation occurs (Part A c, No. 9a). A color change from chromate yellow to dichromate orange also occurs. Conversely, when the pH of a dichromate gelled CMHEC solution is increased to somewhere above 5, the fluid is degelled.

By itself, pH is not a factor. To demonstrate this, sulfuric acid alone was added to CMHEC-saturated, salt solutions. Extremely slight gelation occurred initially, which was lost on further aging after which the solution viscosity decreased indicating polymer degradation (Part B, Tests 11, 12, 13). The low pH is needed in the preferred mode of the invention because dichromate ion will exist only at an acid pH.

2. Gelling CMHEC solutions with dichromate is not limited to salt water systems

CMHEC solutions in calcium chloride (Part C) and in fresh water (Part D), in addition to potassium chloride and sodium chloride, are all gelled by dichromate ion when sufficient dichromate has been added to reduce the pH to around 5 or less. Therefore, the higher the CMHEC solution pH before the addition of dichromate, the more dichromate is required unless an acid is also added.

3. Dichromate concentration range needed to obtain gelation

The amount of dichromate needed is an amount sufficient to reduce the CMHEC solution pH to less than 5. Depending on the starting solution pH (brines often have pH values around 6), this amount can range from 0.25 ppb up to a practical, economic limit, say 2 ppb. More can be used if desired. It will usually be more practical (less expensive) to reduce the pH of a CMHEC solution to a neutral value with acid and then add dichromate, rather than using dichromate alone to accomplish a pH of about 5 or less. Another practical consideration as to choice of a minimum dichromate concentration is from the standpoint of corrosion control. To maintain an effective concentration of dichromate ion of around 1000 ppm, a minimum concentration of around 0.5 ppb dichromate should be used.

TABLE I

| No. | Treatment, | ppb | \multicolumn{5}{c|}{Fann Readings at RPM:*} | Gels* 10 sec/10 min | pH |
|---|---|---|---|---|---|---|---|---|---|
| | | | 600 | 300 | 200 | 100 | 6/3 | | |

Test Procedure - Prepare large CMHEC solution containing 2.0 ppb Lot No. 5115-56 CMHEC with CM DS 0.43, HE MS 2.5 and 1% solution viscosity at 4400 cp as reported by supplier, Hercules, Inc. To 280 ml aliquots of CMHEC solution, added treatment shown, stirred with a spatula, hot-rolled at 150° F. for 3 hours, cooled to room temperature and tested. Re-aged certain samples in the roller oven for various periods and retested.

Part A - Effect of Dichromate, Chromate and "Polyvalent Metal" in CMHEC-Saturated (cp) Salt Solution.
a - Hot-rolled 3 hours at 150° F. - Initial Test

| No. | Treatment | ppb | 600 | 300 | 200 | 100 | 6/3 | 10 sec/10 min | pH |
|---|---|---|---|---|---|---|---|---|---|
| 1 | None-Control | — | 78 | 55 | 44 | 30 | 4/2 | 2/2 | 6.6 |
| 2 | $Na_2Cr_2O_7 \cdot 2H_2O$ | 0.25 | 79 | 56 | 45 | 30 | 4/2 | 2/2 | 4.2 |
| 3 | " | 0.5 | 79 | 56 | 44 | 29 | 4/2 | 2/2 | 4.0 |
| 4 | " | 1.0 | 82 | 58 | 46 | 31 | 5/3 | 2/3 | 3.8 |
| 5 | " | 2.0 | 85 | 60 | 47 | 32 | 6/4 | 3/5* | 3.7 |
| 6 | " | 5.0 | 128 | 90 | 75 | 53 | 12/10 | 12/47 | 3.6 |
| 7 | $(NH_4)_2Cr_2O_7$ | 0.5 | 80 | 57 | 45 | 31 | 5/3 | 3/4 | 3.9 |
| 8 | $K_2Cr_2O_7$ | 0.5 | 81 | 57 | 46 | 31 | 5/3 | 3/3 | 4.0 |
| 9 | $(NH_4)_2CrO_4$ | 0.5 | 80 | 56 | 45 | 30 | 4/2 | 2/2 | 6.0 |
| 10 | $KMnO_4$ | 0.5 | 8 | 4 | 2 | 1 | 0/0 | 0/0 | 6.0 | b - Hot rolled samples overnight (16 hours) at 150° F., retested (discarded)

| No. | Treatment | ppb | 600 | 300 | 200 | 100 | 6/3 | 10 sec/10 min | pH |
|---|---|---|---|---|---|---|---|---|---|
| 1 | None - Control | — | 80 | 57 | 46 | 31 | 4/2 | 2/2 | 7.1 |
| 2 | $Na_2Cr_2O_7 \cdot 2H_2O$ | 0.25 | 84 | 59 | 48 | 33 | 6/4 | 3/6 | 4.6 |
| 3 | " | 0.5 | 86 | 61 | 49 | 33 | 6/4 | 3/5 | 4.4 |
| 4 | " | 1.0 | 112 | 78 | 62 | 42 | 9/6 | 7/12 | 4.3 |
| 5 | " | 2.0 | 248 | 197 | 166 | 120 | 35/29 | 31/70 | 4.2 |
| 6 | " | 5.0 | 300+ | 260 | 220 | 170 | 48/36 | 35/52 | 4.2 |
| 7 | $(NH_4)_2Cr_2O_7$ | 0.5 | 88 | 61 | 49 | 34 | 7/5 | 5/6 | 4.3 |
| 8 | $K_2Cr_2O_7$ | 0.5 | 91 | 65 | 51 | 34 | 7/4 | 4/6 | 4.5 |
| 9 | $(NH_4)_2CrO_4$ | 0.5 | 90 | 57 | 45 | 31 | 4/2 | 3/3 | 6.7 | c - Added $H_2SO_4$ to Sample No. 9 to reduce pH. Hot-rolled samples 1, 2, 3, and 9a for 3 days at 150° F., retested.

| No. | Treatment | ppb | 600 | 300 | 200 | 100 | 6/3 | 10 sec/10 min | pH |
|---|---|---|---|---|---|---|---|---|---|
| 1 | None - Control | — | 82 | 59 | 48 | 33 | 6/3 | 3/3 | 7.9 |
| 2 | $Na_2Cr_2O_7 \cdot 2H_2O$ | 0.25 | 87 | 61 | 49 | 34 | 6/3 | 3/4 | 4.5 |
| 3 | " | 0.5 | 114 | 78 | 62 | 43 | 10/7 | 9/25 | 4.5 |
| 9a | $(NH_4)_2CrO_4$ plus $H_2SO_4$ | 0.5 | 106 | 83 | 67 | 47 | 11/8 | 8/14 | 4.2 |

Part B - Effect of Adding 5N $H_2SO_4$ to CMHEC - Saturated Salt Solution.
a - Hot-rolled 3 hours at 150° F. - Initial Test

| No. | Treatment | ppb | 600 | 300 | 200 | 100 | 6/3 | 10 sec/10 min | pH |
|---|---|---|---|---|---|---|---|---|---|
| 11 | $H_2SO_4$ | .02** | 85 | 61 | 49 | 34 | 6/3 | 3/4 | 6.2 |
| 12 | " | .05** | 85 | 60 | 47 | 32 | 5/3 | 3/4 | 3.6 |
| 13 | " | .2** | 79 | 55 | 44 | 30 | 5/3 | 3/4 | 2.8 | b - Hot-rolled 3 days at 150° F. - Retested

| No. | Treatment | ppb | 600 | 300 | 200 | 100 | 6/3 | 10 sec/10 min | pH |
|---|---|---|---|---|---|---|---|---|---|
| 11 | $H_2SO_4$ | .02 | 81 | 58 | 45 | 31 | 4/2 | 2/2 | 6.8 |
| 12 | " | .05 | 79 | 55 | 44 | 30 | 4/2 | 2/2 | 3.9 |
| 13 | " | .2 | 50 | 31 | 23 | 12 | 0/0 | 0/0 | 2.9 |

Part C - Effect of Dichromate in CMHEC-$CaCl_2$ Solution (40 lb Peladow/bbl sol'n)
a - Hot-rolled 3 hours at 150° F. - Initial Test

| No. | Treatment | ppb | 600 | 300 | 200 | 100 | 6/3 | 10 sec/10 min | pH |
|---|---|---|---|---|---|---|---|---|---|
| 14 | None - Control | — | 80 | 57 | 46 | 32 | 4/2 | 2/2 | 9.1 |
| 15 | $Na_2Cr_2O_7 \cdot 2H_2O$ | 1.0 | 80 | 58 | 47 | 33 | 4/2 | 2/2 | 4.9 |
| 16 | " | 2.0 | 92 | 65 | 52 | 37 | 6/3 | 3/5 | 4.6 |
| 17 | " | 5.0 | 173 | 130 | 106 | 77 | 20/14 | 16/41 | 4.4 |
| 18 | " | 10.0 | 290 | 235 | 208 | 150 | 42/33 | 33/72 | 4.3 | b - Hot-rolled Samples 14, 15, and 16 for 6 days at 150° F. - Retested

| No. | Treatment | ppb | 600 | 300 | 200 | 100 | 6/3 | 10 sec/10 min | pH |
|---|---|---|---|---|---|---|---|---|---|
| 14 | None - Control | — | 68 | 48 | 38 | 24 | 2/1 | 1/1 | 9.3 |
| 15 | $Na_2Cr_2O_7 \cdot 2H_2O$ | 1.0 | 49 | 31 | 22 | 13 | 0/0 | 0/0 | 5.0 |
| 16 | " | 2.0 | 42 | 25 | 18 | 10 | 0/0 | 0/0 | 4.7 |

Part D - Effect of Dichromate in CMHEC - Deionized Water Solution
a - Hot-rolled 3 hours at 150° F. - Initial Test

| No. | Treatment | ppb | 600 | 300 | 200 | 100 | 6/3 | 10 sec/10 min | pH |
|---|---|---|---|---|---|---|---|---|---|
| 19 | None - Control | — | 93 | 70 | 59 | 43 | 10/7 | 7/7 | 6.9 |
| 20 | $Na_2Cr_2O_7 \cdot 2H_2O$ | 1.0 | 84 | 62 | 51 | 37 | 8/5 | 5/5 | 5.1 |
| 21 | " | 2.0 | 84 | 62 | 51 | 37 | 8/5 | 5/7 | 4.8 |
| 22 | " | 5.0 | 93 | 67 | 55 | 39 | 8/5 | 5/6 | 4.6 |
| 23 | " | 10.0 | 128 | 96 | 81 | 59 | 17/12 | 12/27 | 4.8 | b - Hot-rolled overnight (16 hours) at 150° F., Retested

| No. | Treatment | ppb | 600 | 300 | 200 | 100 | 6/3 | 10 sec/10 min | pH |
|---|---|---|---|---|---|---|---|---|---|
| 19 | None - Control | — | 92 | 70 | 58 | 43 | 10/7 | 7/7 | 7.2 |
| 20 | $Na_2Cr_2O_7 \cdot 2H_2O$ | 1.0 | 82 | 59 | 49 | 35 | 6/4 | 4/4 | 5.2 |
| 21 | " | 2.0 | 87 | 63 | 51 | 36 | 7/5 | 5/6 | 5.0 |
| 22 | " | 5.0 | 250 | 190 | 162 | 123 | 38/30 | 32/74 | 4.9 |
| 23 | " | 10.0 | 300+ | To thick to measure accurately. | | | | | 4.8 | c - Hot-rolled Samples 19, 20, 21 for 3 more days at 150° F., Retested

| No. | Treatment | ppb | 600 | 300 | 200 | 100 | 6/3 | 10 sec/10 min | pH |
|---|---|---|---|---|---|---|---|---|---|
| 19 | None - Control | — | 88 | 67 | 56 | 41 | 8/5 | 6/6 | 7.6 |
| 20 | $Na_2Cr_2O_7 \cdot 2H_2O$ | 1.0 | 73 | 51 | 40 | 27 | 4/2 | 2/3 | 5.4 |

TABLE I-continued

| No. | Treatment, | ppb | 600 | 300 | 200 | 100 | 6/3 | 10 sec/10 min | pH |
|---|---|---|---|---|---|---|---|---|---|
| | | | Fann Readings at RPM:*** | | | | | Gels*** | |
| 21 | " | 2.0 | 115 | 87 | 74 | 53 | 14/10 | 12/23 | 5.2 |

*Underlining indicates gelation
**Treatment in ml of acid/280 ml CMHEC solution
***Fann reading is a measure of shear stress at a given shear rate(RPM). Measurements are made with a Fann Model 35 VG meter at various RPM. Gels is gel strength in pounds per 100 square feet after 10 seconds and after 10 minutes.

TABLE II
CMHEC 420H FLUIDS GELLED WITH SODIUM DICHROMATE DIHYDRATE (DiCr)

| Run No. | Mat'l Added lb/bbl | AV*** | PV*** | YP*** | Gels*** | pH | Other |
|---|---|---|---|---|---|---|---|

Part A - DiCr Added to Brines Containing 2.0 lb/bbl CMHEC 420H
a - Saturated NaCl water containing 12,000 ppm Ca++ (hard brine)
Hot-rolled overnight at 66° C. (150° F.):

| 1 | 0.5 | 72 | 40 | 63 | 13/47 | — | | b - West Texas natural brine containing 740 ppm Ca++
Aged 3 days at room temperature:

| 2 | 0.25 | 49 | 28 | 42 | 6/8 | — | | c - Saturated CP (Chemically Pure) NaCl water
Hot-rolled 3 hours at 66° C. (150° F.):

| 3 | 0.5 | 50 | 16 | 68 | 14/48 | — | |

Aged further, overnight at 80° C. (176° F.):

| 3a | | 55 | 23 | 64 | 13/39 | 5.5 | No WL (Water Loss) control |

No. 3a plus 20 lb/bbl bentonite

| 3b | | 42 | 27 | 31 | 3/6 | — | WL = 11.2 ml |

Part B - NaCl* Added to Fresh Water Containing 2.0 lb/bbl CMHEC 420H and 0.5 lb/bbl DiCr
a - Initial results

| 4 | 0 | 46 | 22 | 48 | 6/6 | — | |
| 5 | 15 | 47 | 23 | 48 | 6/7 | — | |
| 6 | 50 | 47 | 23 | 48 | 7/8 | — | |
| 7 | 125 | 52 | 26 | 42 | 8/24 | — | | b - Aged 11 days at 80° C. (176° F.)

| 4 | 0 | 18 | 15 | 5 | 0/0 | 5.5 | |
| 5 | 15 | 46 | 22 | 48 | 9/21 | 5.2 | Chlorides 25 M ppm |
| 6 | 50 | 40 | 24 | 32 | 6/14 | 5.1 | Chlorides 85 M ppm |
| 7 | 125 | 66 | 29 | 75 | 15/41 | 4.8 | Chlorides 190 M ppm |

Part C - Soda Ash Added to Gelled 9.5 lb/gal NaCl Water Containing 1.0 lb/bbl CMHEC 420H and 0.5 lb/bbl DiCr (Aged overnight at 120° F.).

| 8 | 0 | 21 | 14 | 14 | 0/3 | 4.6 | |
| 9 | 0.25 | 12 | 11 | 3 | 0/0 | 6.4 | |
| 10 | 0.5 | 11 | 9 | 4 | 0/0 | 8.3 | |

Mat'l Added, lb/bbl | AV | PV | YP | Gels | pH | CMHEC Type

Part D - 0.5 lb/bbl DiCr added to saturated CP salt water containing various amounts of CMHEC

| CM DS | HE MS | | | | | | |
|---|---|---|---|---|---|---|---|

Results after aging overnight at 80° C. (176° F.)

| 2.0 | 0.9+ | 0.2+ | 32 | 25 | 13 | 0/4 | 4.6 | 902 MH** |
| 2.0 | 0.6 | 2.7 | 38 | 20 | 37 | 2/10 | 4.4 | 627 MH |
| 2.0 | 0.4 | 2.5 | 36 | 22 | 27 | 2/6 | 4.4 | 425 H |
| 4.0 | 0.1 | 2.0+ | 58 | 41 | 34 | 3/5 | 4.4 | 120 ML** |

*KCl gelled similarly; CaCl$_2$ and fresh water fluids required additional DiCr to gel.
**MH = Medium to high viscosity grade; ML = Medium to low viscosity grade.
Note
The underlined gel strength data denote positive gelation. This gelation is quite obvious visually. The data in Part C show that gelation can be reversed simply by increasing the pH to about neutral. This implies that the observed gelation is not dependent upon the reduction of the DiCr by any mechanism. This reversibility can be useful whenever it is necessary to break these gels, i.e., in fracture fluids or in sand packing.
***AV is apparent viscosity in centipoise. PV is plastic viscosity in centipoise. YP is yield point in pounds per 100 square feet. Gels is gel strength in pounds per 100 square feet after 10 seconds and after 10 minutes.

The tests reported in Table III were made by adding 3.2 g of polymer to 560 ml of saturated cp salt water (2 lb/bbl) while it was being stirred at low speed with a Hamilton Beach malt mixer. The samples were then stirred with a Multimixer for five minutes. The samples were each split into two aliquots of 280 ml each. One aliquot was returned to the HB where 0.4 g of sodium dichromate dihydrate (DiCr) was added. This is equal to a concentration of 0.5 lb/bbl. The samples were rolled in a Baroid roller oven at 150° F. for 3 hours. They were then cooled to room temperature, shaken by hand and tested initially (Table III tests No. 1 through 6). They were then rolled overnight at 150° F., cooled to room temperature and retested (Table III, Tests No. 7 through 12).

TABLE III
ATTEMPT TO GEL SATURATED SALT SOLUTIONS OF CELLULOSIC POLYMERS WITH DiCr

| Test No. | Cellulosic Polymer and Lot No. | DiCr lb/bbl | Fann Readings versus RPM | | | | | Gel Strength lb/100 sq ft |
|---|---|---|---|---|---|---|---|---|
| | | | 600 | 300 | 200 | 100 | 6/3 | 10 sec/10 min |
| 1 | CMC | 0 | 62 | 40 | 31 | 18 | 1/0 | 1/1 |
| 2 | 46705 | 0.5 | 62 | 40 | 31 | 18 | 1/0 | 1/2 |
| 3 | HEC* | 0 | 89 | 67 | 56 | 40 | 7/4 | 5/5 |

TABLE III-continued

ATTEMPT TO GEL SATURATED SALT SOLUTIONS OF CELLULOSIC POLYMERS WITH DiCr

| Test No. | Cellulose Ether | DiCr lb/bbl | 600 | 300 | 200 | 100 | 6/3 | Gels 10 sec/10 min |
|---|---|---|---|---|---|---|---|---|
| 4 | 16798 | 0.5 | 91 | 69 | 57 | 41 | 8/4 | 5/5 |
| 5 | CMHEC* | 0 | 109 | 83 | 69 | 52 | 12/8 | 8/7 |
| 6 | 5120-60 | 0.5 | 109 | 82 | 68 | 50 | 10/7 | 7/34 |

Aged Samples

| Test No. | Cellulose Ether | DiCr lb/bbl | Fann Readings versus RPM | | | | | Gels 10 sec/10 min |
|---|---|---|---|---|---|---|---|---|
| | | | 600 | 300 | 200 | 100 | 6/3 | |
| 7 | CMC | 0 | 57 | 35 | 27 | 15 | 1/0 | 1/1 |
| 8 | | 0.5 | 63 | 41 | 31 | 18 | 1/0 | 1/** |
| 9 | HEC | 0 | 85 | 63 | 52 | 37 | 6/3 | 3/3 |
| 10 | | 0.5 | 86 | 63 | 52 | 37 | 6/3 | 3/3 |
| 11 | CMHEC | 0 | 101 | 77 | 64 | 47 | 9/6 | 6/6 |
| 12 | | 0.5 | 252 | 190 | 161 | 121 | 36/29 | 29/60 |

*Added Hercules Defoamer 1052 to these samples before they were tested.
**Sample reacted with exposed bronze spot on viscometer bob. The bob is chrome plated bronze. CMC reacts with copper in salt water.
The CMC lot No. 46705 was Type 9H, the HEC lot No. 16798 was Type 250 HHW, and the CMHEC lot No. 5120-60 was Type 420 H.
See notes at foot of Table I.

In these tests gelation is indicated by an increase in gel strength, especially in 10-minute gel strength. Note that in all of the tests except Tests 11 and 12 the initial gel strength of a sample containing DiCr was essentially the same as that for the corresponding sample which did not contain DiCr. Samples 11 and 12 were the fluids containing CMHEC after they had been aged overnight at 150° F. Sample mud No. 12 had a 10-minute gel strength of 60 lb/100 sq ft which is 10 times as high as that for fluid No. 11. Sample 12 contained DiCr and Sample 11 did not.

When the 10-minute gel strength is considered, each of the samples containing both CMHEC and DiCr, Nos. 6 and 12, shows increased gel strength whereas no other sample shows an increase (the 2 lb/100 sq ft gel strength value for Sample 2 is within the precision of the Fann VG meter, Model 35). The 10-minute gel strengths show an increase whether they are compared with the corresponding initial gel strength or with the gel strength of the corresponding sample without DiCr.

It appears that prior investigations found that $Cr^{+3}$ ions were necessary for crosslinking of polysaccharides such as cellulose. From the foregoing data it is evident that such ions have not been necessary for producing the gels above identified.

Reasonable variation and modification are possible within the scope of the foregoing disclosure and the appended claims to the invention, the essence of which is that there has been produced without use of a reducing agent, a CMHEC gel, as herein described by the method described.

I claim:

1. A gel obtained in a water of any salinity by bringing together a viscosity increasing amount of carboxymethylhydroxyethyl cellulose and a compound selected from the group consisting of alkali metal and ammonium dichromates, in the absence of a reducing agent, said compound being present in the approximate range of from about 0.25 to about 5 pounds per barrel of the gel.

2. The gel of claim 1 wherein the carboxymethylhydroxyethyl cellulose has a carboxymethyl D.S. in the approximate range of 0.1 to 0.9 and an hydroxyethyl M.S. in the approximate range of 0.2 to 2.7.

3. A gel according to claim 1 wherein the metallic dichromatic compound is sodium dichromate dihydrate, $Na_2Cr_2O_7 \cdot 2H_2O$.

4. The gel of claim 1 wherein the compound is selected from sodium, ammonium, and potassium dichromates.

5. The gel of claim 4 wherein the pH of the solution is less than about 5 to insure an acid or dichromate-ion forming medium.

6. A method for producing a gelled polysaccharide which comprises bringing together in aqueous solution a viscosity increasing amount of carboxymethylhydroxyethyl cellulose and a compound selected from the group consisting of alkali metal and ammonium dichromates, in the absence of a reducing agent, said compound being present in the approximate range of from about 0.25 to about 5 pounds per barrel of the gel.

7. A method according to claim 6 wherein the carboxymethylhydroxyethyl cellulose has a carboxymethyl D.S. in the approximate range of 0.1 to 0.9 and a hydroxyethyl M.S. in the approximate range of 0.2 to 2.7.

8. A well drilling operation in which a drilling fluid is employed which comprises circulating in said well while drilling a gel according to claim 1.

* * * * *

UNITED STATES PATENT AND TRADEMARK OFFICE
CERTIFICATE OF CORRECTION

PATENT NO. : 4,239,629                            Page 1 of 2

DATED : December 16, 1980

INVENTOR(S) : Charles A. Sauber

It is certified that error appears in the above—identified patent and that said Letters Patent is hereby corrected as shown below:

Column 6, in Table I (ninth column headed by "Gels"):

line 20, the value "3/5" should be --- $\underline{3/5}$ ---.
    line 21, the value "12/47" should be --- $\underline{12/47}$ ---.
    line 28, the value "3/6" should be --- $\underline{3/6}$ ---.
    line 29, the value "3/5" should be --- $\underline{3/5}$ ---.
    line 30, the value "7/12" should be --- $\underline{7/12}$ ---.
    line 31, the value "31/70" should be --- $\underline{31/70}$ ---.
    line 32, the value "35/52" should be --- $\underline{35/52}$ ---.
    line 33, the value "5/6" should be --- $\underline{5/6}$ ---.
    line 34, the value "4/6" should be --- $\underline{4/6}$ ---.
    line 38, the value "3/4" should be --- $\underline{3/4}$ ---.
    line 39, the value "9/25" should be --- $\underline{9/25}$ ---.
    line 40, the value "8/14" should be --- $\underline{8/14}$ ---.
    line 44, the value "3/4" should be --- $\underline{3/4}$ ---.
    line 45, the value "3/4" should be --- $\underline{3/4}$ ---.
    line 46, the value "3/4" should be --- $\underline{3/4}$ ---.
    line 55, the value "3/5" should be --- $\underline{3/5}$ ---.
    line 56, the value "16/41" should be --- $\underline{16/41}$ ---.
    line 57, the value "33/72" should be --- $\underline{33/72}$ ---.
    line 66, the value "5/7" should be --- $\underline{5/7}$ ---.
    line 67, the value "5/6" should be --- $\underline{5/6}$ ---.
    line 68, the value "12/27" should be --- $\underline{12/27}$ ---.
    line 72, the value "5/6" should be --- $\underline{5/6}$ ---.
    line 73, the value "32/74" should be --- $\underline{32/74}$ ---.
    line 77, the value "2/3" should be --- $\underline{2/3}$ ---.

UNITED STATES PATENT AND TRADEMARK OFFICE
CERTIFICATE OF CORRECTION

PATENT NO. : 4,239,629

DATED : December 16, 1980

INVENTOR(S) : Charles A. Sauber

It is certified that error appears in the above—identified patent and that said Letters Patent is hereby corrected as shown below:

Column 7, in Table I (ninth column headed by "Gels")

line 4, the value "12/23" should be --- $\underline{12/23}$ ---.

Column 7, in Table II (sixth column headed by "Gels")

line 24, the value "13/39" should be --- $\underline{13/39}$ ---.
    line 26, the value "3/6" should be --- $\underline{3/6}$ ---.
    line 32, the value "8/24" should be --- $\underline{8/24}$ ---.
    line 35, the value "9/21" should be --- $\underline{9/21}$ ---.
    line 36, the value "6/14" should be --- $\underline{6/14}$ ---.
    line 37, the value "15/41" should be --- $\underline{15/41}$ ---.
    line 40, the value "0/3" should be --- $\underline{0/3}$ ---.
    line 46, the value "0/4" should be --- $\underline{0/4}$ ---.
    line 47, the value "2/10" should be --- $\underline{2/10}$ ---.
    line 48, the value "2/6" should be --- $\underline{2/6}$ ---.
    line 49, the value "3/5" should be --- $\underline{3/5}$ ---.

Signed and Sealed this

Thirtieth Day of October 1984

[SEAL]

Attest:

GERALD J. MOSSINGHOFF

Attesting Officer

Commissioner of Patents and Trademarks